March 27, 1956 R. J. PHELPS 2,740,106

PRIVATE LINE COMMUNICATION SYSTEM

Filed Oct. 26, 1954

4 Sheets-Sheet 1

INVENTOR
RICHARD J. PHELPS
BY R. V. Craddock
ATTORNEY

INVENTOR
RICHARD J. PHELPS
BY R. J. Craddock
ATTORNEY

March 27, 1956 R. J. PHELPS 2,740,106

PRIVATE LINE COMMUNICATION SYSTEM

Filed Oct. 26, 1954 4 Sheets-Sheet 3

INVENTOR
RICHARD J. PHELPS
BY R. V. Craddock
ATTORNEY

INVENTOR
RICHARD J. PHELPS
BY
R. J. Craddock
ATTORNEY

United States Patent Office 2,740,106

Patented Mar. 27, 1956

2,740,106

PRIVATE LINE COMMUNICATION SYSTEM

Richard J. Phelps, Rockville Centre, N. Y., assignor to Sperry Rand Corporation, a corporation of Delaware Application October 26, 1954, Serial No. 464,822

12 Claims. (Cl. 340—147)

This invention relates to communication systems, and more particularly, is concerned with a communication system for sending pulse coded information to a plurality of receiving points in an extremely brief period of time.

Various systems have heretofore been proposed in the prior art for the transmitting of numerous routine reports and information from a single ground station to a large number of aircraft, such as in the air traffic control around a large airport or the like. It is desirable in such communication systems to be able to individually select any one of the large number of aircraft present and to transmit the required information in a period of time as short as possible and using a minimum radio frequency bandwidth.

It is the general object of this invention to provide an improved communication system by means of which information can be communicated to any one of a large number of receiving stations from a transmitting station.

Another object of this invention is the provision of a communication system in which information can be relayed to each of a large number of receiving stations in rapid succession.

Another object of this invention is the provision of a communication system in which the information sent to each receiving station together with the identity of the station is rechecked at the control station automatically to insure that the proper receiving station has received the correct message.

These and other objects of the invention which will become apparent as the description proceeds are achieved by providing a communication system in which information is relayed in the form of binary pulse code groups, corresponding to decimal digits. The entire message including an address number identifying a particular substation is set up in a decimal form. The control station converts each digit of the message to binary pulse code form, and transmits the binary pulse code groups to all substations. Since there are only two binary digits, 0 and 1, any binary number can be represented by a pulse group, including no pulse for an 0 and a pulse for a 1. The first pulse code group, identifying the particular substation, is received by all substations after a "stand-by" long pulse is transmitted alerting all the receiving substations. The first pulse code group is stored at the substations and compared pulse by pulse with the locally produced pulse code group. Only the particular substation where a match between the two groups is effected is then gated for reception of the message.

Before the message is transmitted from the central control station, the first pulse code group as stored at the selected substation is retransmitted back to the control station where it is matched with a stored version of the original pulse code group. If a match occurs, the control station is triggered for further transmission of the message.

The message as set up in binary form is transmitted in pulse code groups. At the substation, a rotating magnetic drum recorder is provided with recorded pulse code groups indicative of the decimal digits of 0 to 9, which are repeated as many times as there are decimal digits in the complete message.

When a pulse code group is received, it is compared with the recorded groups until a match occurs. A pulse is then recorded at that instant on the drum, the pulse "marking" the correct code group on the drum for later reference. The pulse code group as received at the substation is retransmitted back to the control station where it is compared with the stored version of the original message. If there has been proper transmission in transfer to the substation, a match results, and the next code group comprising the message is then triggered for relay to the substation. The same process outlined above is repeated until the entire message is relayed to the substation and recorded in the form of reference pulses on the drum, one pulse for each digit of the message.

The time sequence of the recorded reference pulses on the drum establishes a means of reproducing the decimal number message at the substation. This is done by suitable means, such as rotating dials each of which displays the digits 0 to 9. The proper digit on each dial is illuminated by a flash lamp, which is flashed from the reference pulses recorded on the drum. Thus the entire message in the form of illuminated numbers is displayed at the substation.

For a better understanding of the invention reference should be had to the accompanying drawings, wherein:

Fig. 1 is a block diagram of the circuit at a control station;

Figs. 2 and 2*a* are block diagrams of the circuit at a substation;

Figure 1:
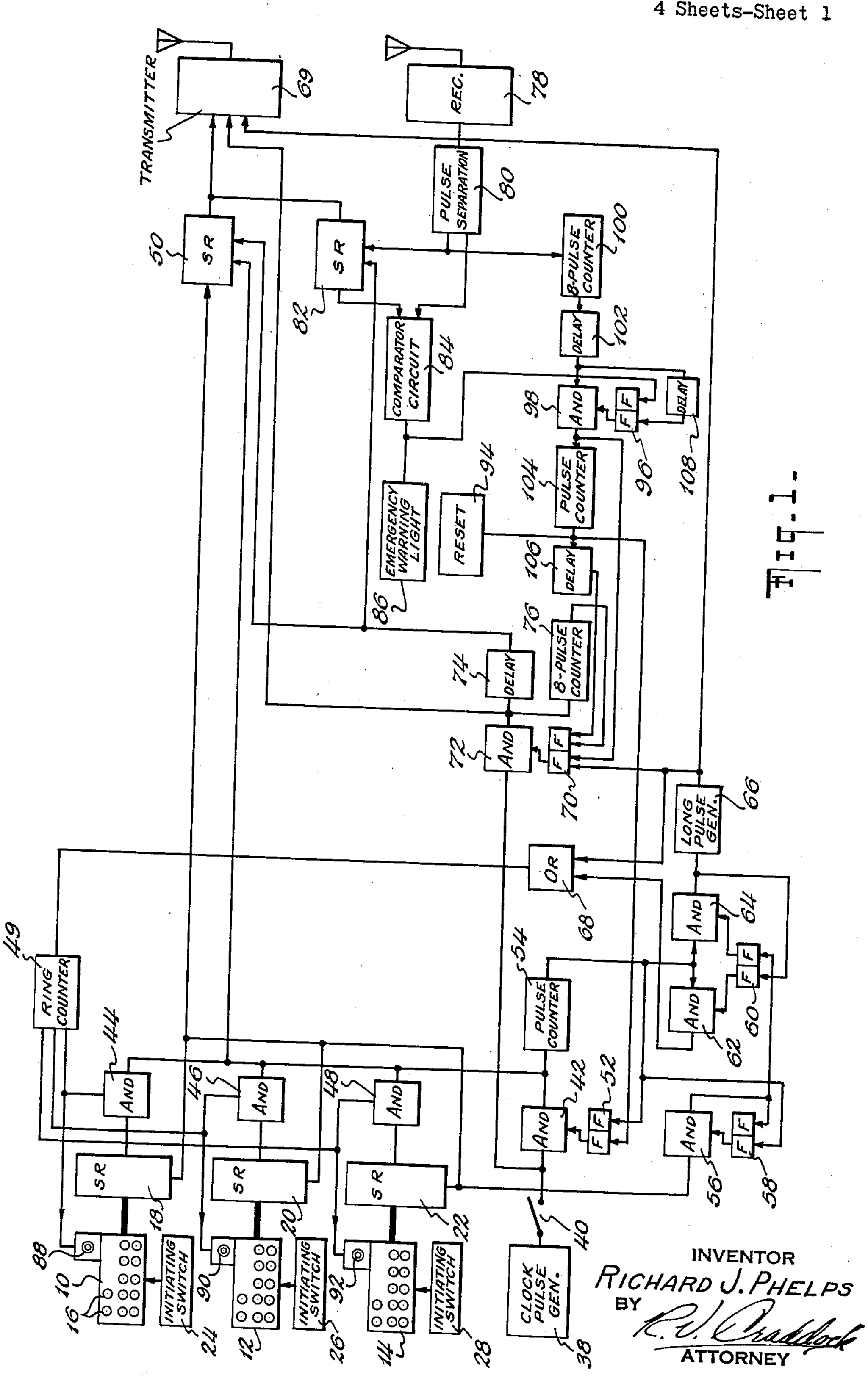
Figures 2, 6:
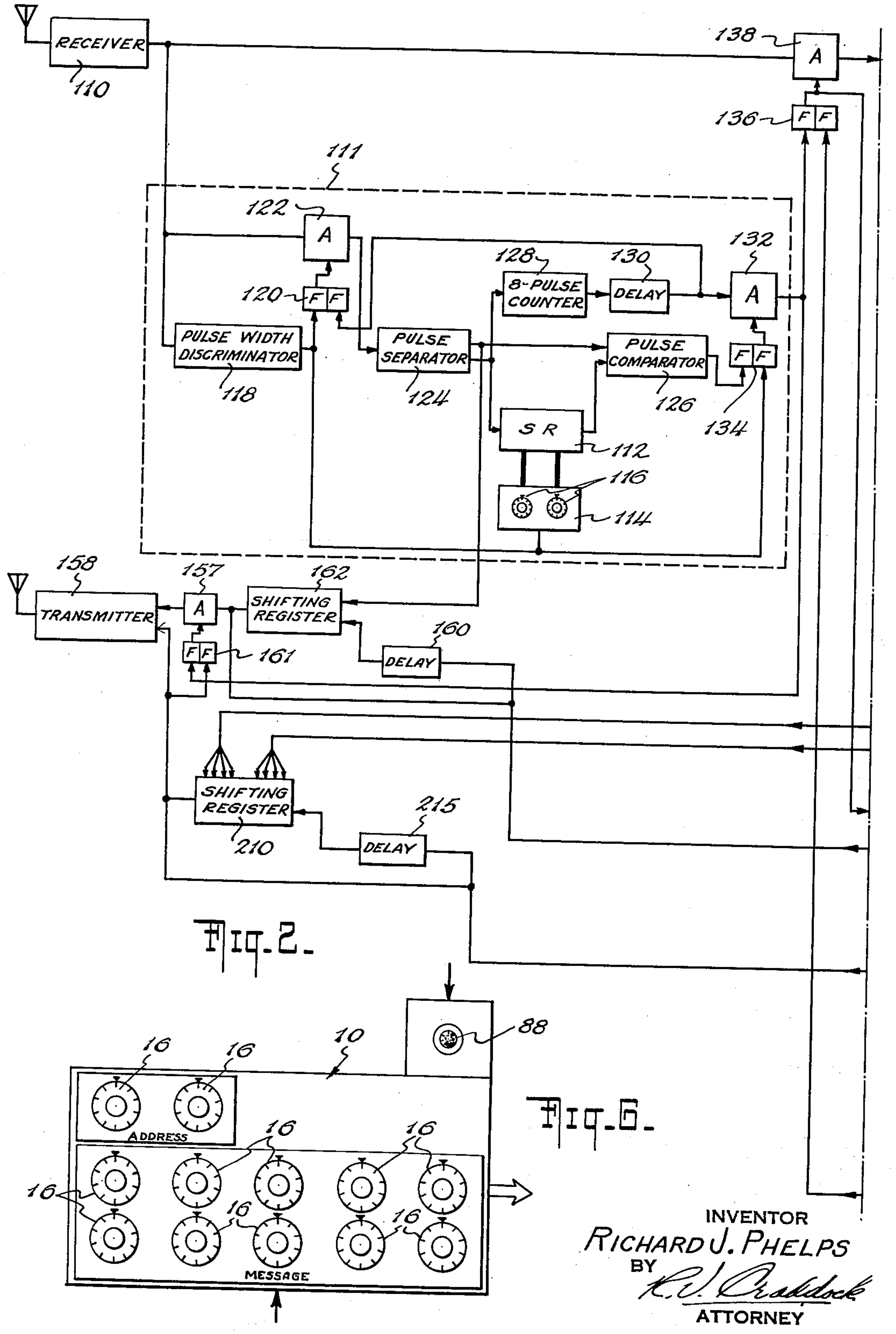
Fig. 6 is an elevational view of a switch control panel at the ground station.

Referring to Fig. 1, the control station is provided with a plurality of control panels, three of which are indicated generally at 10, 12, and 14. Each control panel, as best seen in Fig. 6, is provided with a plurality of ten-position selector switches, as indicated at 16, two of which are provided on each control panel for setting the address number of a selected one of a plurality of substations. The remaining switches 16 on each of the control panels, ten in number in the embodiment illustrated, are provided for setting each of the decimal digits comprising a single message to be directed to the selected substation. While ten such message switches are shown in the figure, it is to be understood that any number may be provided depending on the number of digits desired in the messages to be sent.

Associated with each of the control panels is a shifting register, as indicated at 18, 20, and 22. Also associated with each of the control panels is an initiating switch, as indicated at 24, 26, and 28. When an initiating switch is actuated, the address digits and the message digits as established on the associated control panel by the switches 16 are transferred to the associated shifting register, where the numbers set on the switches are stored in their equivalent binary form.

Figure 4:
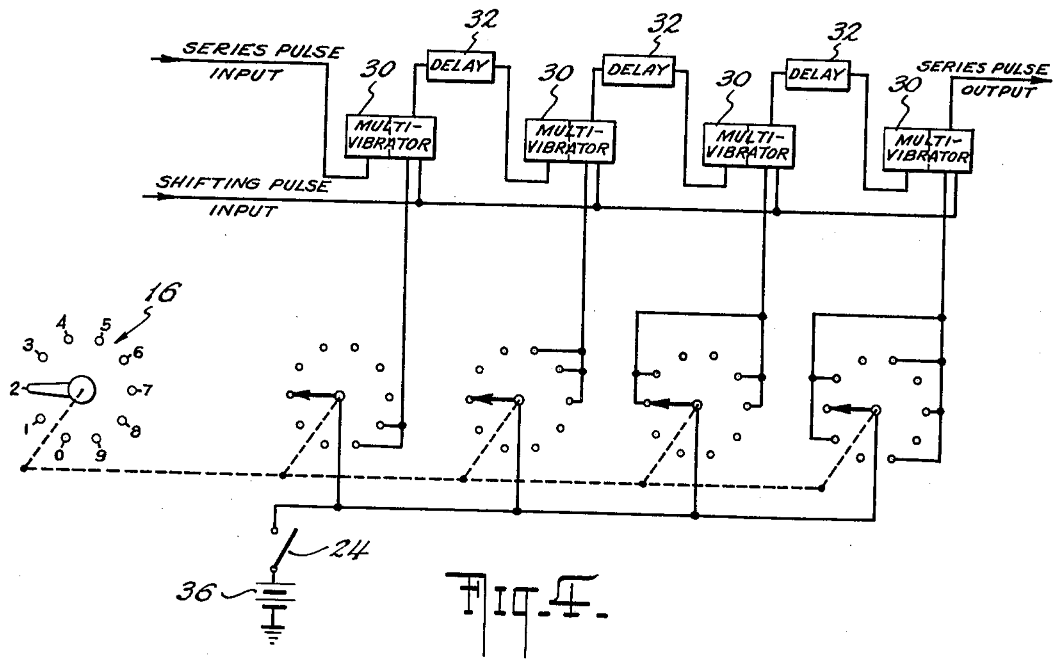
Fig. 4 is a schematic block diagram of a shifting register such as used in both the control station and the substation circuits.

Referring to Fig. 4, there is shown a portion of a shifting register including bistable multivibrators 30, each having two stages with corresponding stable conditions which may be designated as 0 and 1 respectively. These multivibrators are connected by means of delay networks 32. A "shifting pulse" applied at the shifting pulse input is simultaneously coupled to one stage of each of the multivibrators 30, triggering each multivibrator in the 0 condition. All stages previously in the 1 condition simultaneously produce an output pulse; those previously in the 0 condition are of course unaffected by the shifting pulse. The output pulses of the stages shifted from the 1 condition to the 0 condition by the shifting pulse are passed on to the next stage through one of the delay networks 32, so that a shifting pulse supplied at the shifting pulse input in effect transfers the condition of each stage to the next stage. Each shift causes the final stage to produce an output pulse when it is in the 1 condition, but no output pulse when it is in the 0 condition. Each shift leaves a successive stage, starting with the first one, at 0.

The shifting registers 18, 20 and 22 each consist of four multivibrator stages for each of the decimal numbers set on the control panel, including the two numbers for the address. This makes a total of forty-eight such stages in each shifting register in the embodiment illustrated. Connections are brought out separately from each stage to the associated control panel with its switches 16. Each of the switches, one of which is shown in Fig. 4, comprises a ten-position four-pole selector type switch connected through the momentary contact initiating switch 24 to a D.-C. potential source 36. Each selector switch 16 is connected to the associated four stages of the register in such manner that when the initiating switch 24 is closed, selected stages are supplied, through the switch 16, with a voltage pulse which presets certain of the stages to the 1 condition. A predetermined pattern, depending on the number to which a particular selector switch 16 is set, is thereby established on the associated four stages of the shifting register. The same source 36 and switch 24 are used to preset all stages of the associated register 18. Complete messages set on the control panels 10, 12, and 14 may be thus stored in binary form on the shifting registers 18, 20, and 22 by setting all the selector switches 16 and actuating the initiating switches 24, 26, and 28 respectively.

A timing or clock pulse generator 38, which may be a blocking oscillator or other circuit known in the art for producing clock pulses, is connected to the shifting pulse input of each of the shifting registers 18, 20, and 22, through an on-off switch 40, a gate or And circuit 42, and through respective And circuits 44, 46, and 48. These last three And circuits are gated open successively by a ring counter 49, which is cycled by means hereinafter described so that the messages as stored on each of the shifting registers 18, 20, and 22 are successively shifted out by the clock pulses from the source 38. The series pulse output of each of the shifting registers 18, 20, and 22 is connected to the series pulse input of a similar shifting register 50, where the message is temporarily stored before transmission. Shifting pulses from the output of the And circuit 42 are also used to shift the register 50.

The And circuit 42 is controlled by a bistable multivibrator or flip-flop 52 which is set to an initial condition in which the And circuit 42 is open to pass pulses from the pulse generator 38. (It should be noted that by the convention followed in the figures, when a pulse is fed to the side of the multivibrator which is connected to the associated And circuit, the And circuit is biased to its open condition, whereas when a pulse is fed to the multivibrator to the side not connected to the And circuit, the And circuit is biased to its closed condition.)

The "close" side of the multivibrator 52 is connected to the output of a pulse counter 54 which in turn is fed from the output of the And circuit 42. The counter 54 is arranged to produce an output pulse after a number of pulses is received at the input of the counter 54 corresponding to the number of stages in the shifting registers 18, 20, 22, and 50, e. g., after forty-eight pulses are received. The output pulse from the counter 54 triggers the multivibrator 52 so as to bias the And circuit 42 closed and thus interrupt the flow of clock pulses to any of the shifting registers 18, 20, 22, and 50.

Any pulses from the shifting registers 18, 20, or 22 fed to the shifting register 50 are also coupled through an And circuit 56, which is initially open, to a multivibrator 58 that controls the bias on the And circuit 56. The first pulse passing through the And circuit 56 triggers the multivibrator 58 to close the And circuit 56, thereby blocking any further pulses from the shifting registers 18, 20, and 22.

At the same time, the first pulse passed by the And circuit 56 is coupled to a multivibrator 60 which controls the bias of two And circuits 62 and 64, the pulse from the And circuit 56 triggering the multivibrator 60 to open the And circuit 64 and close the And circuit 62. The output pulse from the counter 54 is fed to the input of the respective And circuits 62 and 64 and, providing there was a message stored on the particular shifting registers 18, 20, or 22 to which shifting pulses are being directed so that the multivibrator 60 is triggered, the output pulse from the counter 54 is passed by the now open And circuit 64 to a long pulse generator 66, and to the multivibrator 60 to again close the And circuit 64 and open the And circuit 62. The long pulse generator 66, when triggered, puts out a pulse of considerably longer duration than the clock pulses.

It should be noted at this point that if no message was stored on the particular shifting register to which the clock pulses are being directed, no pulse is passed to the multivibrator 60 and consequently the output pulse from the counter 54 passes through the And circuit 62 rather than through the And circuit 64. Under such circumstances the pulse passed by the And circuit 62 is coupled through a buffer or Or circuit 68 to the ring counter 49. The ring counter 49 is thus actuated so as to open the next successive gate whereby the clock pulses are coupled to the next of the shifting registers 18, 20, or 22 without further action of the control station circuit.

Assuming that a message has been stored on the shifting register to which clock pulses are directed, the long pulse generator 66 is triggered by the pulse from the counter 54 as soon as the stored message is transferred to the shifting register 50. The output of the long pulse generator is coupled to the modulation input of a conventional transmitter 69 from whence it is transmitted to all of the substations. As will hereinafter become apparent, the long pulse from the generator 66, when received by all the substations, automatically alerts all the substations to receive the subsequent address pulses from the control station.

The output from the long pulse generator is also connected to a multivibrator 70 which controls an And circuit 72, the output from the long pulse generator 66 triggering the multivibrator 70 so as to bias the And circuit 72 to its open condition. Clock pulses from the source 38 are connected through the now open And circuit 72 to the transmitter 69 where they are transmitted to all of the substations as synchronizing pulses.

The pulses passed by the And circuit 72 are also coupled through a delay circuit 74 to the shifting pulse input of the shifting register 50, whereby the message stored on the shifting register 50 is shifted out to the transmitter 69 and hence transmitted to the substations.

The output of the And circuit 72 is also connected to eight-pulse counter 76, the output of which is connected to the multivibrator 70, so that when eight pulses have been passed by the And circuit 72, an output pulse is generated by the eight-pulse counter 76 which triggers the multivibrator 70 to close the And circuit 72. Thus only the first eight binary digits, indicative of the two decimal digits of the address number set on the control panel, are initially transmitted along with the long pulse from the generator 66.

As hereinafter brought out in the description of the substation circuit, the first group of eight binary digits transmitted are received and stored at the substation and then retransmitted back to the control station to check for errors in relaying the message. The retransmitted pulses are received at the control station by a receiver 78 together with synchronizing pulses sent out by the substation. The demodulated output of the receiver 78 is fed to a pulse separation circuit 80 which separates the synchronizing pulses from the binary digit pulses. The synchronizing pulses are connected to a shifting register 82, the series pulse input of which is connected to the series pulse output of the shifting register 50 for storing the initial eight binary digits transmitted from the control station.

The code group as stored on the shifting register 82 and the code group as reproduced at the output of the pulse separation circuit 80 are compared in a pulse comparison circuit 84, which generates an output pulse if there is any mismatch between the two pulse code groups. Any mismatch results in the lighting of an emergency warning light 86, immediately informing the operator that the code message has not gone through properly to the substations. Each of the control panels is provided with a pilot light, such as indicated at 88, 90, and 92 respectively, which is actuated from the output of the ring counter 49, thus giving a visual indication as to which of the control panels is involved in the immediate message being transmitted. When the emergency warning light 86 flashes on, the operator can tell which of the messages has not gone through by noting which of the pilot lights 88, 90, or 92 is lit at the time. This permits the operator to contact the particular substation by auxiliary radio phone or other means, and to proceed to trace the source of the trouble. A reset switch 94 is provided which is connected to the multivibrator 52. The reset switch acts to open the And circuit 42 and start another train of clock pulses from the source 38 to the next one of the shifting registers 18, 20 or 22. It should be noted that the output from the long pulse generator 66 is also connected to the Or circuit 68 for triggering the ring counter 49 to cycle the ring counter to open the next successive one of the And circuits 44, 46, or 48, whether the next message is initiated by the reset switch or by the normal cycling of the control station circuit.

The output of the comparator circuit 84 is also coupled to a multivibrator 96 that controls the bias on an And circuit 98, which is normally in the open condition. A mismatch at the comparator circuit 84 produces a pulse which triggers the multivibrator 96 and biases the And circuit 98 to the close condition. If a match exists between the pulse code group stored on the shifting register 82 and that produced at the output of the pulse separation circuit 80, no output pulse is generated by the comparison circuit 84, and the And circuit 98 remains open.

The synchronization pulse output of the pulse separation circuit 80 is coupled to an eight-pulse counter 100 which produces an output pulse following eight input pulses. The output pulse is passed through a delay circuit 102 to the input to the And circuit 98. If there has been no mismatch, the And circuit 98 remains open and the delayed pulse from the delay circuit 102 passes through to the multivibrator 70, triggering the multivibrator so as to bias the And circuit 72 to open.

Thus another series of clock pulses are passed by the And circuit 72, repeating the above process and shifting the next message portion out of the shifting register 50 and transmitting it to the substations. This process is repeated until all of the message portions making up the entire message are relayed to the substation, retransmitted, and checked.

Each message portion results in an output pulse at the And circuit 98 which is coupled to a pulse counter 104. When all the portions are transmitted and checked (in the present example six pulses will have been received at the pulse counter 104) an output pulse is produced from the counter 104 which is fed to the multivibrator 52, triggering the multivibrator to bias the And circuit 42 open. Since the long pulse generator 66 has already actuated the ring counter 49, the train of pulses now passed by the And circuit 42 are directed to the next successive shifting register for transmission of the next message.

The output of the pulse counter 104 is also coupled through a delay circuit 106 to the multivibrator 70, which is thereby triggered to close the And circuit 72. This is necessary because the output from the And circuit 98 normally results in the And circuit 72 being open following transmission and checking of the last pulse code group of the message.

In the event that the And circuit 98 is closed by a mismatch at the comparator circuit 84, the output of the delay circuit 102 is utilized to trigger the multivibrator 96 so as to open the And circuit 98 again. A delay circuit 108 is provided to insure that the And circuit 98 remains in the close condition at the instant the output pulse is received from the delay circuit 102.

Figure 5:
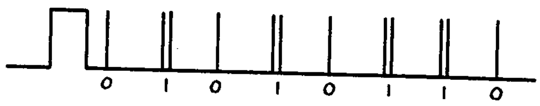
Fig. 5 is a graphical plot of a typical pulse code group.
Figure 3:
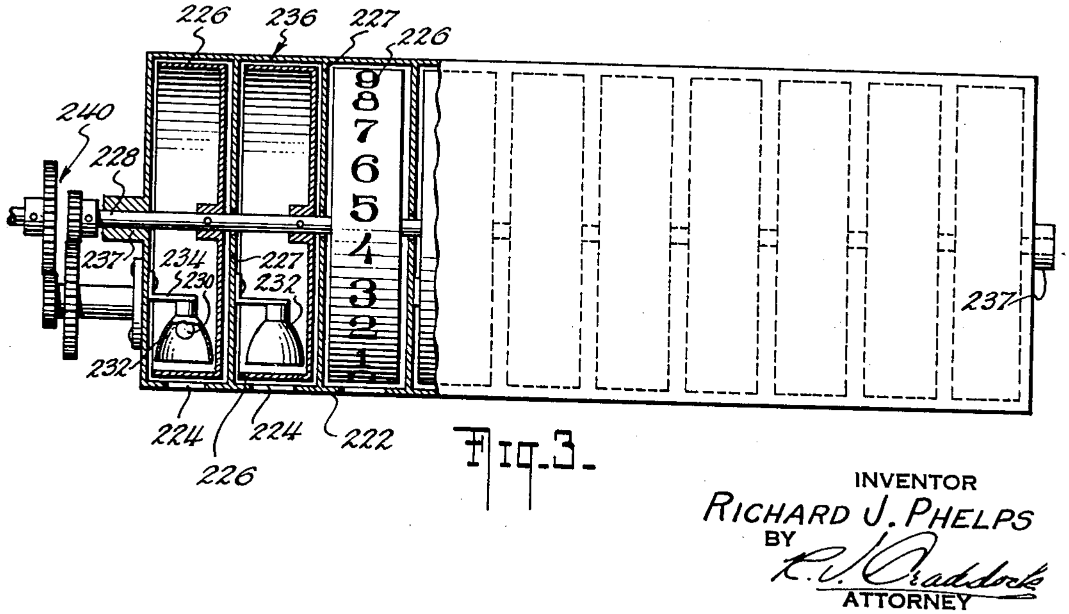
Fig. 3 is a schematic showing of message display apparatus for the substation.

From the above description of the control station circuit, it will be appreciated that the information transmitted comprises first a long pulse followed by eight synchronizing pulses with the interposed binary numbers in the form of a pulse for a 1 binary digit and no pulse for a 0 binary digit. A typical message portion shown in Fig. 5, in which the decimal number 56 is reproduced in binary form, namely, 0101 and 0110. Each transmitted message portion of eight synchronizing pulses and binary digit pulse and no pulse combinations representing two of the decimal digits of the message are followed by similar portions, after the rechecking process is effected, until the entire message is transmitted.

Referring to the block diagram of the substation circuit shown in Fig. 2, numeral 110 indicates a receiver tuned to the carrier frequency of the transmitter 69. The demodulated output of the receiver is a pulse group of the type shown in Fig. 5, including initially a long pulse followed by eight synchronizing pulses with binary pulses interposed. The substation includes an address selector circuit, indicated generally at 111. The address selector circuit has a shifting register 112 with a parallel number input circuit 114 including ten-position selector switches 116 which may be set to the decimal number representing the particular substation. While selector switches are shown, each substation can be preset and wired to respond to only one address number.

The output of the receiver 110 is coupled to a pulse width discriminator 118 in the address selector circuit 111 that is designed to produce an output pulse only in response to an input pulse of substantially the duration of that provided by the long pulse generator 66 at the transmitter station. The output of the pulse width discriminator opens the And circuit 122, which controls an And circuit 122, whereby a pulse from the pulse width discriminator opens the And circuit 122. The output of the And circuit 122 is connected to a pulse separator circuit 124 which separates the synchronizing pulses from the binary digit pulses. The synchronizing pulses are connected to the shifting pulse input of the shifting register 112.

The output of the pulse width discriminator 118 is connected to the parallel number input circuit 114, whereby the decimal digits set on the switches 116 are stored in their equivalent binary form on the shifting register 112 in exactly the same manner as above described in connection with Fig. 4. This binary number is shifted out of the register 112 by the synchronizing pulses from the pulse separator 124 into a pulse comparator circuit 126. The local pulse code group from the shifting register 112 is compared with the received pulse code group from the pulse separator 124, the pulse comparator circuit 126 producing an output pulse whenever a mismatch between the two binary code groups exists (which would be the case whenever the address number set on the switches 116 would not be the same as the address signal sent out by the control station).

Also connected to the synchronizing pulse output of the pulse separator circuit 124 is an eight-pulse counter 128, which produces an output pulse after eight synchronizing pulses have been passed by the pulse separator circuit 124. The output from the eight-pulse counter 128 passes through a delay circuit 130 to an And circuit 132 that is controlled by a multivibrator 134. If no mismatch is detected by the pulse comparator circuit 126, the And circuit 132 remains in its normally open condition, passing the output of the delay circuit 130 to a multivibrator 136 which controls an And circuit 138. The pulse from the And circuit 132 to the multivibrator 136 triggers the multivibrator to open the And circuit 138, the And circuit 138 being connected to the output of the receiver 110.

Thus it will be seen that in the event a match exists between the local address code group of the shifting register 112 and the first pulse group received by the receiver 110, the And circuit 138 is opened to provide reception of the subsequent message by the balance of the substation circuit. However, if a mismatch occurs, the And circuit 132 is closed so that no pulse is received at the multivibrator 136 and consequently the And circuit 138 remains closed and no further reception of the message is possible at that substation. It should be noted that the And circuit 122 is reset to its closed condition, following reception of the initial pulse code group, by the output pulse from the delay circuit 130, which is connected back to the multivibrator 120. Also the And circuit 132 is reset to its normally open condition, in the event of a mismatch, by the next received long pulse, which produces an output pulse from the pulse width discriminator 118 as coupled to the multivibrator 134. Therefore, at all substations in which a mismatch of the address code group exists, the above-described address selector circuit is returned to its initial condition for the reception of the next long pulse indicating transmission of another message.

Figure 2A:
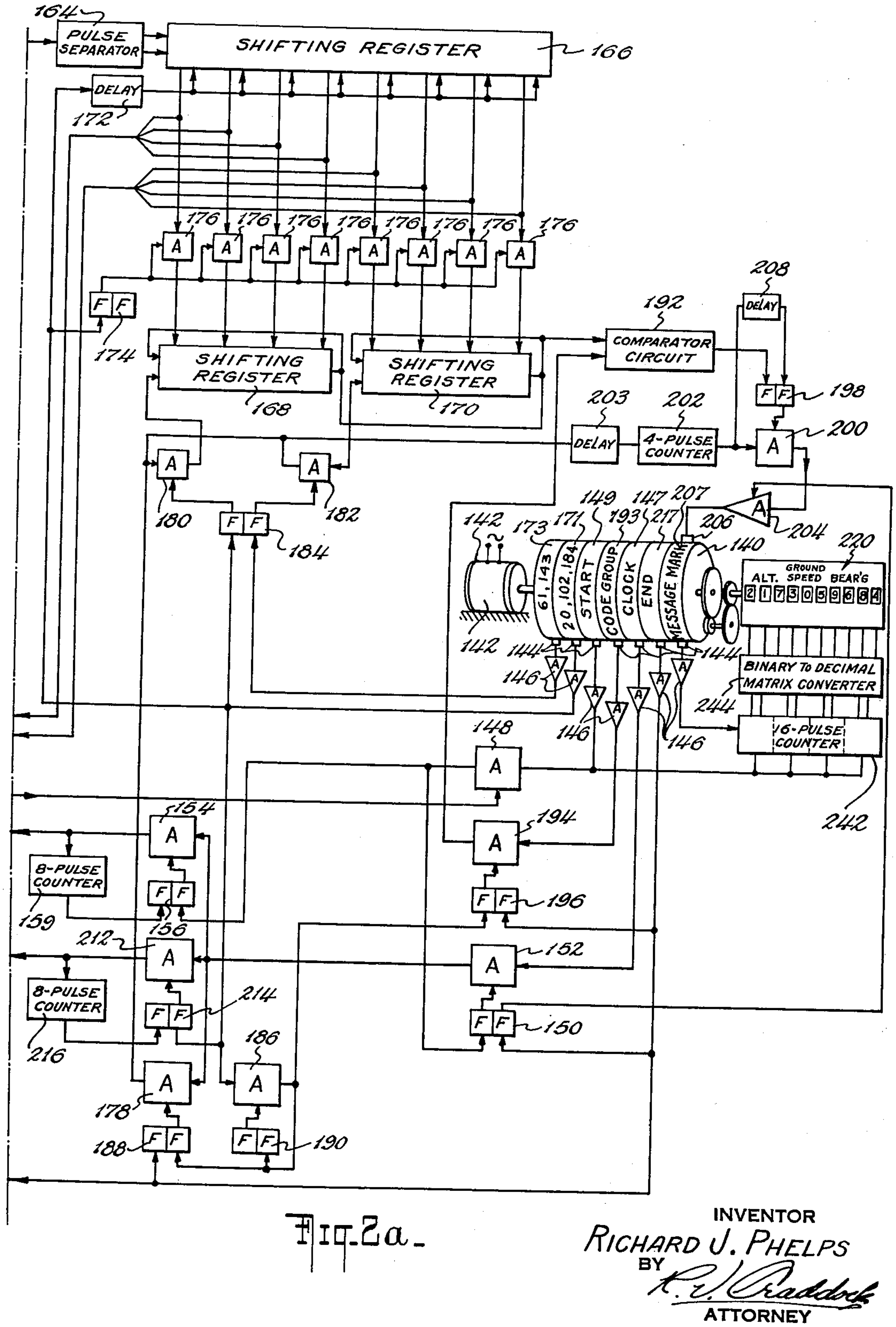

Each substation is provided with a magnetic drum recorder (see Fig. 2*a*) having at least seven recording channels, the magnetic drum 140 of the recorder being rotated by a motor 142. Each of the channels is provided with a magnetic pick-off element, such as indicated at 144, the output from the magnetic pick-off elements being amplified by suitable amplifying means, such as indicated at 146. One of the channels, indicated at 147, of the magnetic drum recorder has recorded thereon a series of pulses which are utilized as local synchronizing pulses having approximately the same period as the synchronizing or clock pulses of the control station. However, exact synchronism between the local clock pulses and the control station clock pulses is not essential.

Another of the channels, indicated at 149, has recorded thereon a single pulse which acts as a starting pulse. This channel is coupled to an And circuit 148 which is controlled by the same multivibrator 136 as controls the And circuit 138. Thus the And circuit 148 is opened by the triggering of the multivibrator 136 in the event a match exists between the local address of the substation and the address pulse group sent out by the control station. The starting pulse passed by the And circuit 148 triggers a multivibrator 150 which opens an associated And circuit 152. The input to the And circuit 152 is coupled to the clock pulse channel 147 on the magnetic drum 140, the output of the And circuit 152 in turn being coupled to the input of an And circuit 154 controlled by a multivibrator 156. The multivibrator 156 is also triggered by the starting pulse passed by the And circuit 148 to open the And circuit 154.

The clock pulses from the magnetic drum 140 are passed by the open And circuits 152 and 154 to a transmitter 158, by means of which they are relayed back to the control station. The same clock pulses are also coupled through a delay circuit 160 to the shifting pulse input of a shifting register 162. The series pulse input of the shifting register 162 is connected to the binary pulse group output of the pulse separator circuit 124, whereby the address pulse group initially received from the control station is stored on the shifting register 162, from which it is shifted out to the transmitter 158 by the delayed clock pulses from the delay circuit 160.

An And circuit 157, controlled by a multivibrator 161, couples the output of the shifting register 162 to the transmitter 158. The And circuit 157 is opened by the triggering of the multivibrator 161 in response to an output pulse from the And circuit 132, so that any partial address pulse group transferred to the register 162 before a mismatch occurs at the comparator 126 is not transmitted.

The address pulse group is retransmitted back to the control station, together with synchronizing pulses, for matching with the initial pulse group at the control station in the manner above described. In the event that a match exists at the control station, the first message portion is sent out from the control station to be picked up by the receiver 110. An eight-pulse counter 159 is coupled to the output of the And circuit 154, the counter 159 producing an output pulse following eight clock pulses to trigger the multivibrator 156 and close the And circuit 154.

Since the And circuit 138 is now open at the one substation properly addressed, further pulse groups making up the transmitted message as they are received are passed to a pulse separator circuit 164. This circuit, which is similar to the pulse separator circuits 80 and 124 as above described, separates the synchronizing pulses from the binary pulse group. The synchronizing pulses are connected to the shifting pulse input of an eight stage shifting register 166. The pulse group output of the pulse separator circuit 164 is connected to the series pulse input of the shifting register 166, whereby the message portion from the control station is stored on the shifting register 166 as it is received.

In order to identify the two decimal digits represented by the binary pulse group on the shifting register 166 and also to immediately clear the shifting register 166 for reception of the next pulse group, the binary number on the shifting register 166 is shifted out in parallel to two four-stage recirculating shifting registers 168 and 170. This is accomplished by providing an output pulse from the drum 140 from another channel 171 thereon, the pulse being generated by the channel 171 at an instant corresponding to the twentieth clock pulse. This output pulse from channel 171 is coupled to each stage of the shifting register 166 through a delay circuit 172, and also to a monostable multivibrator 174. When the pulse hits each of the stages of the shifting register 166, those stages in the 1 condition are triggered to the zero condition, producing an output which is coupled to the corresponding stage of the shifting registers 168 and 170.

A series of And circuits, indicated at 176, are provided between the shifting register 166 and the shifting registers 168 and 170. These And circuits, triggered open by the multivibrator 174, normally isolate the shifting registers except during the instant the And circuits 176 are open. The delay circuit 172 insures that the And circuits 176 will be open at the time the parallel shifting pulse hits the shifting register 166. The monostable multivibrator 174 automatically closes the And circuits 176 again after the binary number on the shifting register 166 is shifted to registers 168 and 170.

Shifting pulses are coupled to the shifting pulse input of the shifting registers 168 and 170 from the clock pulse channel 147 by means of the And circuit 152, an And circuit 178, and one of two And circuits 180 and 182 connected respectively to the shifting pulse inputs of the registers 168 and 170. The And circuits 180 and 182 are controlled by a multivibrator 184, the And circuit 180 being biased open by the triggering of the multivibrator 184 by output pulses from channel 171 on magnetic drum 140, while the And circuit 182 is biased open by the triggering of the multivibrator 184 by output pulses from a channel 173 on the magnetic drum 140. The first pulse from channel 171, corresponding to the twentieth clock pulse triggers the shifting register 166 and also triggers the multivibrator 184 to open the And circuit 180. At the same time, this pulse from channel 171 is coupled by means of an And circuit 186 to a multivibrator 188 that controls the And circuit 178, the pulse triggering the multivibrator 188 to open the And circuit 178 and thereby pass clock pulses to the shifting register 168.

The output at the And circuit 186 is also coupled to a multivibrator 190 which controls the And circuit 186, the multivibrator 190 being triggered to close the And circuit 186 after the first pulse from channel 171 of the magnetic drum 140 is passed.

The output of the shifting register 168 is coupled to a comparator circuit 192, which is also connected to the output of another channel 193 on the magnetic drum 140 through an And circuit 194. The And circuit 194 is controlled by a multivibrator 196 that is triggered by the output of the And circuit 186, whereby the And circuit 194 is triggered on at the same time as the And circuit 178, namely, with the output of a pulse from channel 171 of the magnetic drum 140.

Channel 193 of the magnetic drum 140 has recorded thereon, starting in coincidence with the twenty-first clock pulse, each of the decimal digits 0 through 9 in binary pulse code form. A pulse by pulse comparison is made in the comparator circuit 192 between each of the successive binary code groups from the channel 193 and the binary pulse code group on the shifting register 168. As mentioned above, the register 168 continuously recirculates the pulse code group stored thereon. This is accomplished by coupling the series pulse output of the shifting register to its series pulse input.

The pulse comparator circuit 192 operates in the same manner as the pulse comparator circuits 84 and 126 as above described. Thus, whenever a pulse is received from the shifting register 168 but not from the drum 140, or whenever a pulse is received from the drum 140 and not from the shifting register 168, a mismatch is indicated at the comparator circuit 192, resulting in an output pulse. The output of the comparator circuit 192 triggers a multivibrator 198 to close an associated And circuit 200.

A four-pulse counter 202 is connected to the shifting pulse input of registers 168 and 170 through a delay circuit 203. After four shifting pulses, a delayed pulse is produced by the counter 202 which is coupled to the And circuit 200. Thus at the end of the first four pulses following the gating pulse from channel 171, if a mismatch has not been indicated at the comparator circuit 192, the And circuit 200 being open passes the output from the four-pulse counter 202. The output from the And circuit 200 is coupled by an amplifier 204 to a recording head 206 in the magnetic drum recorder, whereby a pulse is recorded on one channel of the drum 140, the channel being indicated at 207. The amplifier 204 includes suitable recording bias for the recording head 206. This bias also erases any previous pulses recorded on channel 207. A connection from the multivibrator 150 to the amplifier 204 acts to cut on the recording bias only during the time the And circuit 152 is open, so that the message marks will not be erased on subsequent revolutions of the drum 140.

If a mismatch is indicated at the comparator circuit 192, the triggering of the multivibrator 198 closes the And circuit 200 so that the output pulse from the four-pulse counter 202 will not be recorded on the magnetic drum 140. Thus a pulse is recorded immediately following the first of the ten binary pulse code groups which matches the code group on the shifting register 168. This recorded pulse, referred to as a message mark, is utilized in a manner hereinafter described to trigger a display panel for visually indicating the corresponding decimal digit.

Following a mismatch pulse output from the comparator circuit 192, the next output pulse from the four-pulse counter 202 is coupled through a delay circuit 208 to the multivibrator 198, whereby the multivibrator 198 is triggered to again open the And circuit 200.

After forty clock pulses have passed, permitting ten binary code groups of four binary digits to be coupled out of the code group channel 193, channel 173 puts out a pulse, corresponding to the 61st clock pulse. This output pulse is coupled to the multivibrator 184. The triggering of the multivibrator 184 opens the And circuit 182 and closes the And circuit 180. When the And circuit 182 is opened, the binary pulse code group on the shifting register 170 is shifted out to the comparator circuit 192 where it is compared pulse by pulse with a second group of ten binary code groups from the channel 193 in the manner above described, resulting in a second message mark, corresponding to the next digit in the message, being recorded on the message mark channel 207 on the magnetic drum 140. Thus the two digits originally received and stored on the shifting register 166 are stored as two message marks on channel 207 in time sequence indicative of the corresponding decimal digits.

The pulse code group stored on the shifting register 166, in addition to being parallel shifted into the registers 168 and 170, is also parallel shifted into an eight-stage shifting register 210 (Fig. 2) for relaying the message portion back to the control station to be rechecked. The series pulse output of the shifting register 210 is coupled to the modulation input of the transmitter 158. Synchronizing pulses to the transmitter 158 and shifting pulses to the shifting register 210 are derived from the clock pulse output of channel 147 on the drum 140. The pulses are passed through the And circuit 152 to an And circuit 212. The And circuit 212 is triggered open by a multivibrator 214 triggered by a pulse from the channel 171 at the same instant a parallel shifting pulse is directed to the shifting register 166. With the And circuit 212 open, clock pulses are coupled to the transmitter 158 to be relayed as synchronizing pulses back to the control station. At the same time the clock pulses are coupled to the shifting register 210 through a delay circuit 215 to shift the pulse code group out of the shifting register 210 for transmission back to the control station. An eight-pulse counter 216 coupled to the output of the And circuit 212 produces an output pulse following eight clock pulses, the output pulse of the counter 216 being coupled to the multivibrator 214 to close the And circuit 212. The synchronizing pulses are also coupled to the multivibrator 161 to reset the And circuit 157 to the closed condition.

As described above, the signal sent out by the transmitter 158 is received at the control station where it is compared with the message portion as originally transmitted, and if a match results at the control station, the next message portion representing the next two decimal digits of the message, is sent out. Since the shifting register 166 has already been cleared, it is ready to receive this next message portion from the control station immediately.

When the second message mark has been recorded on the message mark channel 207 of the magnetic drum 140, a second pulse is put out by the channel 171, corresponding in time to the 102nd clock pulse. This second pulse again triggers the shifting register 166 to transfer the next message portion onto the registers 168 and 170, starting the sequence of recording the next message marks corresponding to the next two decimal digits of the message. This whole process continues until the entire message is transferred and recorded as message marks on channel 207 of the magnetic drum 140, the two channels 173 and 171 alternately putting out pulses at intervals corresponding to forty-one clock pulses. After the entire message is received, another channel, indicated at 217, generates a pulse which is coupled to the multivibrators 196, 150, 190, 188, and 136. Triggering of these multivibrators closes the associated And circuits 194, 152, 178, and 138, while opening the associated And circuit 186. As a result, the substation circuit is restored to its initial condition ready for reception of subsequent messages.

In order to display the received message as stored in the form of message marks on the drum 140, a display panel, indicated generally at 220, is provided at the substation. The display panel 220 includes a front plate 222 in which are provided ten openings 224 through which the appropriate numbers comprising the message are viewed. To make the proper numbers appear at the openings in the plate 222, a series of ten dials 226 of transparent material are mounted on a rotating shaft 228. Each of these dials has provided thereon the digits 0 through 9 in opaque form. Flash lamps 230 within reflectors 232 are mounted, as by brackets 234, to a housing and frame member, indicated generally at 236, within the rotating dials 226. The housing and frame member includes light baffles 227 to prevent the flash lamps from illuminating more than one dial. The shaft 228 is journalled at the ends of the housing and frame member 236 by suitable bearings 237. When a lamp is flashed, the number opposite the opening 224 is illuminated, appearing on the face of the display panel. It will be seen that by flashing the flash lamps at the appropriate instants of time as the dials rotate, any selected ten digit number can be made to appear on the face of the display panel.

This is accomplished by driving the shaft 228 and associated dials 226 from the motor 142 through a set of speed multiplying gears, indicated at 240, which may provide, for example, a 5:1 speed multiplication, so that the dials rotate five times for each revolution of the drum 140. If the numbers on the dials are arranged so that one digit passes in front of the corresponding opening 224 in the same interval that a group of four pulses of a code group on the drum 140 pass a pick-up head 144, then a message mark opposite that particular code group, if utilized to flash the corresponding flash lamp 230, will result in the illumination of the corresponding digit on the face of the display panel 220. By virtue of the speed multiplication effected by the gear train 240, the ten digits on any one dial can be spread out through an arcuate angle five times as great as the arcuate angle subtended by forty clock pulses on the drum 140, so that the numbers can be enlarged and spread out on a smaller dial than otherwise would be required.

In order to flash the flash lamps in sequence as the successive message marks are coupled out of the drum 140, a sixteen pulse binary counter 242, having four binary stages, is coupled to the output of the message mark channel 207 on the drum 140. The counter 242 is connected in parallel into a ten line diode matrix converter 244. Such diode matrix converters are well known in the art for translating a number from binary to decimal notation. See for example, "High-Speed Computing Devices" by Engineering Research Associates, McGraw-Hill Publishing Company, pages 40 to 43. As the ten message marks are received by the counter, successive output lines from the matrix converter are energized. These lines are coupled to the flash lamps in the display panel, suitable pulse amplifying means being incorporated to boost the pulse power sufficiently to flash the lamps. The four stages of the counter 242 are coupled to the output of the start pulse channel 149 of the drum 140 to preset the counter.

It will be seen that each of the ten dials will be illuminated during one revolution of the drum 140. By rotating the drum at sufficient speed, for example, at substantially 1800 R. P. M., the numbers on the face of the display panel will be flashed at a rate as to appear fixed to the human eye. The message can then be read and will continue to appear until the message marks are erased and new marks recorded on the drum by a subsequent message.

From the above description, it is believed the operation of the communication system is apparent. The various units, such as the And circuits, shifting registers, pulse counters, and multivibrators are well known circuits in the digital computer art. The pulse separator circuit, the pulse comparator circuit, and the pulse width discriminator circuit may be of any suitable design for accomplishing the purposes set forth above. Known circuits having these properties are fully described in the copending application S. N. 377,357 filed in the name of the present inventor.

It will be seen that the various objects of the invention have been achieved by the provision of a communication system in which a complete coded message can be sent in a fraction of a second. Utmost reliability is achieved by rechecking the portions of the message as they are relayed. Moreover, messages can be sent in rapid sequence to a plurality of remote points automatically.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A communication system for sending and visually displaying information at any selected one of a plurality of substations from a control station, said system comprising means for storing a preselected message in binary form, means for shifting the message from said storing means in pulse code groups, additional means for storing said pulse code groups as they are shifted from said storing means, means for transmitting said pulse code groups as they are shifted off of the register, means at each substation for receiving the transmitted pulse code groups, means at each substation for generating a preselected binary pulse code group, said preselected pulse code group representing a numbered designation for the particular one of said substations, means at each substation for comparing the first received pulse code group from the control station with the locally generated preselected pulse code group, means for storing said first received pulse code group, means for transmitting the stored pulse code group in response to a matched condition at said comparing means between the first received pulse code group and the preselected pulse code group at the one substation where a match occurs, means at the control station for receiving the retransmitted pulse code group from the one substation, means at the control station for comparing the received pulse code group from the one substation with the stored first pulse code group from said additional storing means, means for shifting a second pulse code group from the message storing means in response to a matched condition at said comparing means, means at each substation actuated in response to a mismatch condition between the first received pulse code group from the control station and the locally generated pulse code group for blocking further reception of pulse code groups from the control station, pulse recording means at the substation including a plurality of channels, one of said channels having binary pulse code groups representing all decimal digits from zero to nine recorded thereon, the pulse code groups being repeated in successive recorded groups on the same channel of the recorder, means for storing the second and successive pulse code groups as received from the control station, means for comparing a particular stored pulse group at said last-named means with each of a recorded set of pulse code groups representing the decimal digits zero through nine, means for recording a pulse on said recording means when a match condition exists at said last-named comparing means between a received and stored pulse code group and one of the set of recorded pulse code groups, means for retransmitting a stored pulse code group in response to a match, the retransmitted group being compared at the control station with the corresponding pulse code group as stored at the control station, whereby each successive pulse code group at the control station is stored and compared with a selected one of the recorded pulse code groups at the substation which matches the pulse code group from the control station before a next pulse code group from the control station is transmitted, and means at the substation for visually displaying simultaneously all the digits corresponding to the transmitted pulse code groups from the control station, the message display means being actuated in response to the recorded pulses from the means for comparing the received pulse groups with the recorded pulse groups.

2. Apparatus as defined in claim 1 wherein means is provided for automatically shifting successive messages on completion of the complete transmission of one message to said means for storing a preselected message.

3. Apparatus as defined in claim 2 further including means at the control station actuated in response to a mismatch condition between the pulse code group as transmitted and as received back from the substation for indicating failure of the communication system in transmitting the desired messages.

4. A communication network comprising a control station and a plurality of substations, the control station including means for storing a preselected numerical message in binary digit form, transmitting means having a modulation input coupled to said storing means, means including a source of pulses coupled to said storing means and said modulation input, said last-named means producing a preselected number of pulses when triggered for shifting out of the storing means a pulse code group of binary digits, means including a long pulse generator coupled to said modulation input and pulse group producing means, whereby a long pulse is transmitted followed by a first group of pulses and a superimposed pulse code group representing a portion of the stored message, means coupled to the output of the storing means for storing the pulse code group as it is shifted to the transmitter, receiving means having a demodulation output, means for comparing a received pulse code group from a substation with said stored pulse code group, means responsive to a match at said comparing means between the received and stored pulse code groups for triggering said pulse group producing means, whereby an additional pulse code group is shifted out and transmitted by a match of a received pulse code group with a previously transmitted pulse code group; and each substation including receiving means having a demodulation output, means for generating a preselected binary pulse code group representing the particular substation, said code group generating means being triggered by the reception of a long pulse from the control station, means coupled to the receiver and the code group generating means for comparing the received pulse code group with the local pulse code group, means for storing the received pulse code group, transmitting means having a modulation input connected to said last-named storing means, means including pulse generating means coupled to said last-named storing means and coupled to the code group comparing means, the code group comparing means actuating the pulse generating means for shifting out the stored pulse code group to the transmitter when a match between the local pulse code group and received pulse code group exists, whereby a next successive pulse code group comprising the message is trigegred out of the control station, means coupled to the receiver for storing subsequent pulse code groups, said last-named means being actuated in response to a match-indicative output of the pulse code group comparing means, whereby subsequent pulse code groups of the message are stored following a match between the initially received pulse code group and the locally generated pulse code group, means coupled to the transmitting means for retransmitting each pulse code group as it is received and stored, and means responsive to the stored pulse code groups for indicating the desired number represented by the binary digits of the stored pulse code groups.

5. A communication network for relaying a number code message from a central station to a selected one of a plurality of substations, said network comprising, at the central station, means for storing the message in binary digit form, means for setting the message on said means, means including a pulse source coupled to the storing means for generating a predetermined number of pulses when triggered, whereby triggering of said last-named means shifts out a portion of the message as a binary pulse code group from the storing means, means at the selected substation for storing said pulse code groups as they are received, means for generating in binary form all the possible pulse code groups in sequence which can be established at the central station, all the possible pulse code groups being repeated as many times as there are code groups comprising the entire message, means for comparing a received pulse code group with each of the successively generated pulse code groups, means responsive to a match at said comparing means for producing a pulse at the instant a match is indicated between the received pulse code group and one of the recorded pulse code groups, means for recording the output pulse from said last-named means, means for triggering the pulse generating means at the central station in response to reception of the pulse code group at a substation, whereby successive pulse code groups are shifted out to the substation as the previous pulse code groups are received and stored, the resulting pulses from the comparing means being recorded in time sequence on the pulse recording means, and means at the substation for indicating the numerical message in response to the time intervals between the recorded pulses on the pulse recording means.

6. A communication network as defined in claim 5 wherein said means at the substation for generating all of the possible pulse code groups and said means for recording the output pulses from the code group comparing means include magnetic recording means having at least two recording channels.

7. A communication network as defined in claim 6 wherein said message indicating means includes a plurality of dials having decimal digits thereon, one dial for each of the digits in the message number, the dials being rotated in synchronism with said recording means, and light flashing means associated with each of the dials and successively flashed by the successive pulses recorded by the recording means, whereby appropriate digits on the dials are instantaneously illuminated from the recorded pulses in response to the decoded message.

8. In a communication system, means for storing a numerical message, said means storing each decimal digit of the message in an equivalent binary pulse code group, means for setting the message into the storing means, means triggering out a portion of the message at a time from the storing means, each portion including at least one pulse code group representing a decimal digit of the numerical message, means at a remote point coupled to the output of the storing means for receiving and storing said message portions as they are received, means at said remote point for generating in sequence all the possible pulse code groups representing the ten possible decimal digits, means for comparing each of the pulse code groups as received with the generated pulse code groups, said last-named means producing an output pulse whenever a match occurs, whereby a pulse is generated for each pulse code group received, and means responsive to the match indicative pulses and synchronized with the pulse code group generating means for indicating the decimal digits corresponding to the code groups.

9. In a system as defined in claim 8, means for redirecting the message portion as received and stored at the remote point back to the source point of the message and means at the source point for comparing the relayed and redirected message portion with the original message portion, said last-named means actuating said means for triggering out a portion of the stored message to trigger a next message portion when a match occurs, whereby successive message portions are relayed only when the previous portions relayed match the message as initially stored at the source point.

10. In a communication system, means for storing a numerical message, said means storing each decimal digit of the message in an equivalent binary pulse code group, means for setting the message into the storing means, means triggering out a portion of the message at a time from the storing means, each portion including at least one pulse code group representing a decimal digit of the numerical message, means at a remote point coupled to the output of the storing means for receiving and storing said message portions as they are received, means for recording and reproducing ten different pulse code groups, corresponding to the ten possible decimal digits, each pulse code group being repeated as many times as there are digits in the number message, means for reproducing the pulse code groups in succession from the recording means, means for comparing each of the different recorded pulse code groups with each one of the pulse code groups as relayed to the remote point, said comparing means producing an output pulse wherever a match between pulse code groups occurs, means synchronized with the pulse group reproducing means for recording the pulse at the instant a match occurs, whereby a recorded matching pulse code group is permanently identified by a synchronous match-indicative pulse, means at the remote point for selectively displaying at one time a plurality of decimal digits corresponding to the number of digits in the message, said last-named means including means synchronized with the recording means and actuated by the match-indicative pulses for selecting the appropriate decimal digits according to the relative time intervals of the match-indicative pulses.

11. In a communication system in which information is relayed in the form of pulses indicative of binary digits, decoding apparatus for visually displaying the information in equivalent decimal number form comprising means for receiving and storing the binary digits in pulse code groups, means for reproducing successively ten binary pulse code groups corresponding to the ten decimal digits, each pulse code group being repeated for reproduction of a plurality of times, means for comparing each pulse code group as received and stored with the reproduced pulse code groups, said comparing means producing an output pulse when a match between a received and reproduced pulse group occurs, means synchronized with said pulse group reproducing means for recording and reproducing the output pulse from said comparing means, and indicating means including a plurality of dials having the ten digits appearing thereon and rotated in synchronism with the pulse recording means, and light flashing means associated with each of the dials and successively flashed by the successive pulses from the pulse recording means, whereby appropriate digits on the dials are illuminated by the recorded pulses in response to the received information.

12. In a communication system in which information is relayed in the form of pulses indicative of binary digits, decoding apparatus for visually displaying the information in equivalent decimal number form comprising means for receiving and storing the binary digits in pulse code groups, means for reproducing successively ten binary pulse code groups corresponding to the ten decimal digits, each pulse code group being repeated for reproduction a plurality of times, means for comparing each pulse code group as received and stored with the reproduced pulse code groups, said comparing means producing an output pulse when a match between a received and reproduced pulse group occurs, means synchronized with said pulse group reproducing means for recording and reproducing the output pulse from said comparing means, and indicating means for selectively displaying a plurality of digits, said last-named means including means synchronized with the pulse recording means and actuated by the match-indicative pulses for selecting the appropriate decimal digits according to the relative time intervals of the match-indicative pulses.

References Cited in the file of this patent

UNITED STATES PATENTS

| | | |
|---|---|---|
| 784,393 | Grabosch | Mar. 7, 1905 |
| 1,933,650 | Bascom | Nov. 7, 1933 |
| 2,059,204 | Boswau | Nov. 3, 1936 |
| 2,440,118 | Reinhold | Apr. 20, 1948 |
| 2,497,936 | Finch | Feb. 21, 1950 |
| 2,533,242 | Gridley | Dec. 12, 1950 |
| 2,626,383 | Coley | Jan. 20, 1953 |
| 2,666,911 | Reynolds | Jan. 19, 1954 |